United States Patent
Bastin

(10) Patent No.: US 7,500,677 B2
(45) Date of Patent: Mar. 10, 2009

(54) SYSTEM FOR AND METHOD OF CONTROLLING SWAY MOVEMENT OF A PRODUCT STORAGE TANK ON A WHEELED CHASSIS ASSEMBLY

(75) Inventor: Bruce G. Bastin, Starbuck, MN (US)

(73) Assignee: CNH America, LLC, Racine, WI (US)

( * ) Notice: Subject to any disclaimer, the term of this patent is extended or adjusted under 35 U.S.C. 154(b) by 525 days.

(21) Appl. No.: 11/424,382

(22) Filed: Jun. 15, 2006

(65) Prior Publication Data

US 2008/0001368 A1 Jan. 3, 2008

(51) Int. Cl.
*B60G 21/00* (2006.01)
(52) U.S. Cl. .................. 280/7; 280/5.506; 280/5.509
(58) Field of Classification Search .............. 280/5.506, 280/5.508, 5.509, 6.16, 7, 5.5
See application file for complete search history.

(56) References Cited

U.S. PATENT DOCUMENTS

| | | | |
|---|---|---|---|
| 2,520,944 A | 9/1950 | Lynn et al. | |
| 2,784,978 A | 3/1957 | Seale | |
| 2,934,353 A | 4/1960 | D'Avigdor | |
| 3,154,320 A | 10/1964 | D'Avigdor | |
| 3,174,770 A | 3/1965 | Drechsel | |
| 3,980,316 A | 9/1976 | Yates | |
| 5,437,354 A | * 8/1995 | Smith | ............ 188/266.1 |

* cited by examiner

*Primary Examiner*—Ruth Ilan
*Assistant Examiner*—Drew J. Brown
(74) *Attorney, Agent, or Firm*—Rebecca Henkel

(57) ABSTRACT

A sway control arrangement configured to control movement of a product storage tank supported on a wheeled chassis assembly is provided. The wheeled chassis assembly includes a leaf spring in support of a frame and a tank on a transverse axle relative to a forward direction of travel. The sway control arrangement includes a master cylinder actuator in fluid communication with a pair of slave cylinders. The master cylinder is mounted between the frame and the leaf spring. The pair of slave cylinders are spaced apart from one another and mounted between the tank and the frame. The master cylinder communicates a fluid signal representative of a movement of the leaf spring relative the frame. In response to the fluid signal, the pair of slave cylinder actuators reduces movement of the tank from generally level alignment relative to the axle.

20 Claims, 3 Drawing Sheets

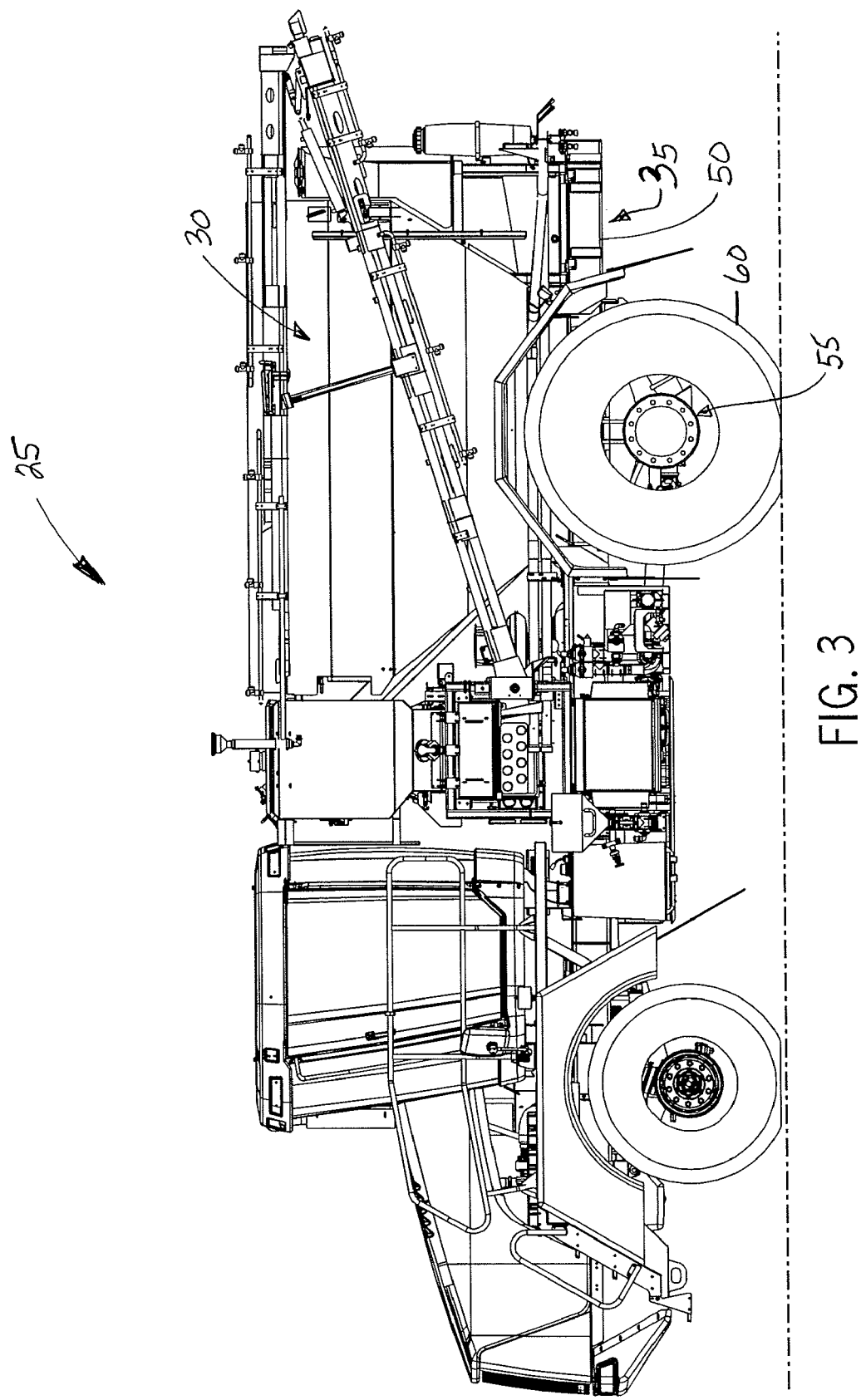
FIG. 3 -- PRIOR ART --

SYSTEM FOR AND METHOD OF CONTROLLING SWAY MOVEMENT OF A PRODUCT STORAGE TANK ON A WHEELED CHASSIS ASSEMBLY

CROSS-REFERENCE TO RELATED APPLICATIONS

Not applicable.

BACKGROUND OF THE INVENTION

1. Field of the Invention

The invention relates to a vehicular chassis assembly and, more particularly, relates to a vehicular chassis assembly in combination with a secondary suspension system configured to control sway associated with a product load independent of a primary suspension system.

2. Discussion of the Related Art

Vehicles and towed trailers are commonly employed to carry one or more storage tanks loaded with product. Conventional suspension systems for certain load-carrying vehicles and/or towed storage tank trailers are known to employ leaf springs having a spring rate configured to provide enhanced ride characteristics of the vehicle or towed trailer.

However, these conventional suspension systems have drawbacks. For example, the leaf springs employed with certain vehicles or towed storage tank trailers are difficult to design with sufficient stiffness and stability against miscellaneous lateral forces acting on the storage tank when cornering a turn, while also providing enhanced ride characteristics for the operator. As these certain known vehicles or trailers maneuver a corner, a center of gravity of the vehicle/trailer moves upwardly in the vertical direction above the axle, where the miscellaneous lateral forces compress the leaf springs and increase opportunities for the loaded storage tank to roll or tip-over.

Accordingly, there is a need for a method of and an arrangement configured for reducing swaying movement, and thereby reducing opportunities of a vehicle and/or trailer carrying a loaded storage tank from tipping over, especially when the vehicle and/or trailer is maneuvering a corner. The arrangement should be simple to manufacture, install and operate. Also, the arrangement should be capable of being employed with a variety of vehicles and/or towed implements or trailers mounted by a storage tank, in addition to those related to agriculture.

SUMMARY OF THE INVENTION

The present invention provides an arrangement to control a sway movement of a product storage tank supported on wheeled chassis assembly that addresses the drawbacks described above.

In a first embodiment of the present invention, a sway control arrangement configured to control movement of a product storage tank supported on a wheeled chassis assembly is provided. The wheeled chassis assembly includes a leaf spring in support of a frame and a tank on a transverse axle relative to a forward direction of travel. The sway control arrangement includes a master cylinder actuator in fluid communication with a pair of slave cylinders. The master cylinder is mounted between the frame and the leaf spring. The pair of slave cylinders are spaced apart from one another and mounted between the tank and the frame. The master cylinder communicates a fluid signal representative of a movement of the leaf spring relative the frame. In response to the fluid signal, the pair of slave cylinder actuators reduces movement of the tank from generally level alignment relative to the axle.

In the preferred arrangement, the arrangement is a closed system such that the master cylinder, the first slave cylinder actuator, and the second slave cylinder actuator are only in hydraulic fluid communication with one another. The master cylinder is connected at a generally central area of the leaf spring and generally above the axle in a vertical direction. The master cylinder includes a lower end pivotally connected at the frame and an upper end that is connected at the leaf spring. The first slave cylinder is located forward of the axle and the second slave cylinder is located rearward of the axle relative to the forward direction of travel.

In the preferred arrangement, the sway control arrangement includes a left-hand sub-arrangement located on one side of a central longitudinal axis of the vehicle opposite a right-hand sub-arrangement, each left-hand and right-hand sub-arrangement includes the master cylinder in fluid communication with the first and second slave cylinders. Each first and second slave cylinder actuator includes a lower end pivotally connected at the frame, and an upper end connected at the tank. In response to a deflection of the leaf spring upwardly in a vertical direction relative to the frame, the master cylinder communicates a signal that causes the slave cylinders to extend generally upwardly in the vertical direction.

In another embodiment, the present invention provides an agricultural implement that includes a wheeled chassis including at least one leaf spring in support of a frame and a tank on a transverse axle relative to a forward direction of travel, and an arrangement configured to reduce a movement of the tank from a generally level alignment relative to the axle. The arrangement includes a master cylinder actuator mounted between the frame and the leaf spring, and first and second slave cylinder actuators spaced apart from one another and mounted between the tank and the and the frame. The first and second slave cylinders are in fluid communication with the master cylinder. In response to movement of the leaf spring relative to the frame, the master cylinder actuator communicates a fluid signal representative of the movement to the first and second slave cylinder actuators. In response to the fluid signal, the arrangement reduces movement of the tank relative to the axle.

In another embodiment, the present invention provides a method of reducing movement of a tank relative to an axle of a wheeled chassis assembly in general accordance with the foregoing description.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 3 illustrates a known vehicular agricultural applicator.

DETAILED DESCRIPTION OF THE PREFERRED EMBODIMENTS

Figure 1:
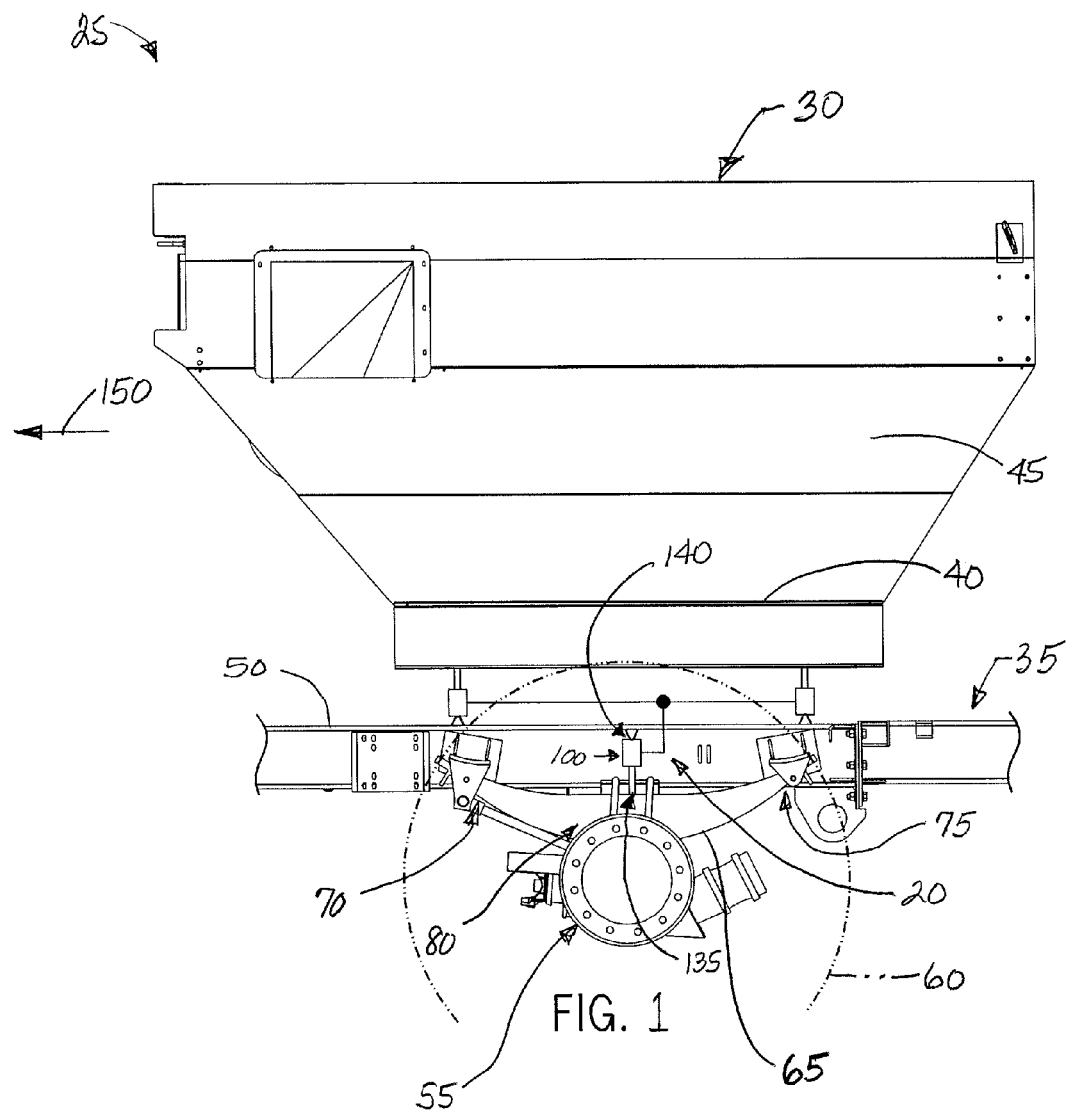
FIG. 1 illustrates a side elevation view of a sway control arrangement in accordance with the present invention employed in combination with chassis of a vehicular agricultural applicator.

FIG. 1 illustrates an exemplary sway control arrangement 20 of the present invention configured to control sway movement associated with operation of a vehicle 25. The exemplary vehicle 25 is an agricultural applicator mounted with a bulk storage tank 30 configured to carry a load of product for distribution of across a field. The type of product (e.g., seed, herbicide, pesticide, fertilizer, etc.) can vary.

The vehicle 25 generally supports the bulk storage tank 30 on a wheeled chassis assembly 35. The bulk storage tank 30 generally includes a lowermost floor 40 and a series of walls 45 extending upwardly in the vertical direction therefrom. The exemplary wheeled chassis assembly 35 includes a wheeled frame 50 supported from the ground by at least one wheeled axle assembly 55 mounted with one or more wheels 60. Although a four-wheeled vehicle 25 is shown, it should be understood that the sway control arrangement 20 of the invention can be employed on various types (e.g., a three-wheeled floater, etc.) of wheeled chassis assemblies.

The frame 50 is generally supported from the wheeled axle assembly 55 by a leaf spring 65 located on opposed lateral sides of a central longitudinal axis of the vehicle 25. The exemplary leaf spring 65 includes a forward end 70 located forward of the axle 55, and a rearward end 75 located rearward of the axle 55, and a curvilinear portion 80 extending therebetween. The forward and rearward ends 70 and 75 of each leaf spring are attached at the frame. The curvilinear portion 80 of each leaf spring 65 is attached at the axle 55 of the vehicle 25. The leaf spring 65 is generally configured in a conventional manner to reduce vibrations and other miscellaneous forces (e.g., associated with operation of the vehicle 25 over rough terrain) from transferring from the wheeled axle assembly 55 to the frame 50 and bulk storage tank 30 mounted thereon. Accordingly, the leaf spring 65 is designed with a spring rate so as enhance the ride characteristics of the wheeled chassis assembly 35 of the vehicle.

The sway control arrangement 20 of the invention is generally configured to reduce opportunities of sway or roll or lateral movement of the vehicle 25 about its center of gravity. An example where a likelihood of sway movement occurs is when the vehicle 25 is maneuvering a corner carrying a load of product in the bulk storage tank 30. The exemplary arrangement 20 includes a left-hand sub-arrangement 85 and a right-hand sub-arrangement 90 each offset in opposed lateral directions from the central longitudinal axis of the bulk fill tank 30. The left-hand and right-hand sub-arrangements 85 and 90 are separate from, and not in fluid communication with, one another. The left-hand sub-arrangement 85 is generally configured to reduce or control sway movement generally at the left-hand side of the vehicle 25, and the right-hand sub-arrangement 90 is generally configured to reduce or control sway movement generally at the right-hand side of the vehicle 25.

Figure 2:
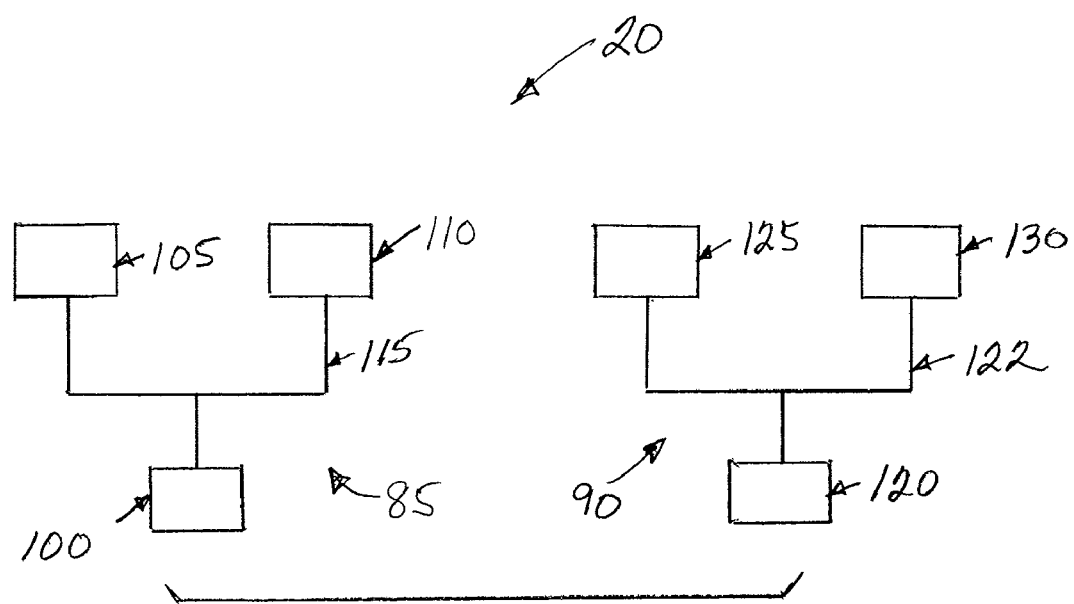
FIG. 2 illustrates a schematic diagram of the sway control arrangement of the invention.

As illustrated in FIG. 2, the exemplary left-hand sub-arrangement 85 includes a master-cylinder actuator 100 and a pair of slave cylinder actuators 105 and 110 which are solely in fluid communication via a fluid line 115 with only one another. The exemplary master cylinder actuator 100 and slave cylinder actuators 105 and 110 are linear moving and hydraulic-driven. Alternatively, various other types (e.g., pneumatic, electronic, rotary, etc.) of actuators can be employed. Although this description refers to the construction and manner of operation of the left-hand sub-arrangement 85, it should be understood that the right-hand sub-arrangement 90 includes a master cylinder actuator 120 connected by a fluid line 122 to a pair of slave cylinder actuators 125 and 130 of similar construction and operational in a similar manner as the master cylinder actuator 100 and slave cylinder actuators 105 and 110 of the left-hand sub-arrangement 85.

Referring specifically to the left-hand sub-arrangement 85 as illustrated in FIG. 1, the master cylinder actuator 100 is configured to detect relative movement between the leaf spring 65 and the frame 50. The exemplary master cylinder actuator 100 is generally located centered over the axle 55 in the vertical direction. A first free end 135 of the master cylinder actuator 100 is pivotally connected at the leaf spring 65. A second free end 140 of the master cylinder actuator 100, opposite the first end 135, is pivotally connected at the frame 50. This configuration allows the master cylinder actuator 100 to detect movement between the leaf spring 65 and frame 50. More specifically, movement between the leaf spring 65 and frame 50 causes the second free end 140 of the master cylinder actuator 100 to move in a linear direction relative to the first free end 135. This linear movement between the first and second ends 135 and 140 of the master cylinder actuator 100 is converted to a signal representative of the movement between the leaf spring 65 and the frame 50 that is communicated to the pair of slave cylinder actuators 105 and 110.

Each of the pair of slave cylinder actuators 105 and 110 are connected in fluid communication to receive the signal from the master cylinder actuator 100. The first slave cylinder actuator 105 is located forward of the axle 55, and is connected between the forward end of the bulk storage tank 30 and the frame 50. The second slave cylinder actuator 110 is located rearward of the axle 55, and is connected between the rearward end of the bulk storage tank 30 and the frame 50. This design of the arrangement 20 provides for few parts and simple installation and operation.

Having described the general construction of the arrangement 20, the following is a description of the operation of the arrangement 20 in reducing or controlling sway movement of the bulk storage tank 30 about the wheeled chassis assembly 35 of the vehicle 25.

Assume for example, that the vehicle 25 is traveling with a load of product in the field in a generally linear, forward direction of travel 150 and that the bulk storage tank 30 is generally level in relation to the axle 55 of the vehicle 25. As the vehicle 25 maneuvers a corner (e.g., at the end of the field) and turns for example leftward from the generally forward direction of travel 150, miscellaneous forces (e.g., centrifugal, gravity, etc.) associated with cornering the vehicle 25 with a load of product causes the leaf spring 65 at the left-hand sub-arrangement 85 to compress and thereby cause a reduction in the distance between the frame 50 and the axle 55. The movement between the leaf spring 65 and the frame 50 is detected by the master cylinder actuator 100. More specifically, the movement causes the second free end 140 of the master cylinder actuator 100 to move in a linear direction relative to the first free end 135. This linear movement between the first and second ends 135 and 140 of the master cylinder actuator 100 is converted to the signal representative of the movement between the leaf spring 65 and the frame 50 that is communicated to the pair of slave cylinder actuators 105 and 110. In response to the signal, each of the slave cylinder actuators 105 and 110 extends in the linear direction so as to maintain a general distance between the bulk storage tank 30 and the axle 55 of the wheeled chassis assembly 35.

Accordingly, the master cylinder actuator 100 operates in combination with the slave cylinder actuators 105 and 110 to maintain the bulk storage tank 30 generally level relative to the axle 55 of the wheeled chassis assembly 35. It should be understood that the leaf spring 65 at the right-hand sub-arrangement 90 would perform in a similar yet opposite manner such that the distance between the right-hand leaf spring (not shown) and the frame 50 is increased and the master cylinder actuator 120 linearly contracts so as to create a signal that causes the slave cylinder actuators 125 and 130 to linearly contract in length in a manner that maintains a distance between the bulk storage tank 30 and the axle 55 of the wheeled chassis assembly 35. In the above-described manner, the arrangement 20 reduces the sway movement of the bulk storage tank 30 in the lateral direction transverse to the direction of travel 150. In addition, the above-described operation of the arrangement 20 reduces the stress on the leaf spring 65.

A wide variety of vehicles could be constructed in combination with the arrangement 20 in accordance with the invention. Hence, while the exemplary embodiment of the arrangement 20 is generally described with reference to a vehicular agricultural applicator, the invention is not so limited. It should be understood that the sway control arrangement 20 can be employed with wide variety of wheeled chassis assemblies 35 and is not limiting on the invention. Also, although FIG. 1 shows the arrangement 20 in combination with a bulk storage tank 30 of rectangular shape, the arrangement 20 can be employed with bulk storage tanks 30 having a variety of shapes.

Many changes and modifications could be made to the invention without departing from the spirit thereof. The scope of these changes will become apparent from the appended claims.

I claim:

1. A sway control arrangement in combination with a wheeled chassis assembly, the wheeled chassis assembly including a leaf spring in support of a frame and a tank on a transverse axle relative to a forward direction of travel, the arrangement comprising:
   a master cylinder actuator mounted between the frame and the leaf spring; and
   a first slave cylinder actuator and a second slave cylinder actuator spaced apart and mounted between the tank and the frame, the first and second slave cylinders in fluid communication with the master cylinder,
wherein the master cylinder communicates a fluid signal representative of a movement of the leaf spring relative the frame, and wherein in response to the fluid signal, the arrangement reduces movement of the tank relative to the axle.

2. The arrangement as recited in claim 1, wherein the first slave cylinder is located forward of the axle and the second slave cylinder is located rearward of the axle relative to the forward direction of travel.

3. The arrangement as recited in claim 1, wherein the arrangement is a closed system such that the master cylinder, the first slave cylinder actuator, and the second slave cylinder actuator are only in fluid communication with one another.

4. The arrangement as recited in claim 1, wherein the master cylinder includes a lower end pivotally connected at the frame and an upper end that is connected at the leaf spring.

5. The arrangement as recited in claim 1, wherein each first and second slave cylinder actuator includes a lower end pivotally connected at the frame, and an upper end connected at the tank.

6. The arrangement as recited in claim 1, wherein the arrangement includes a left-hand sub-arrangement located on one side of a central longitudinal axis of the vehicle opposite a right-hand sub-arrangement, each left-hand and right-hand sub-arrangement includes the master cylinder in fluid communication with the first and second slave cylinders.

7. The arrangement as recited in claim 1, wherein a signal representative of a deflection of the leaf spring upwardly in a vertical direction relative to the frame causes the slave cylinders to extend generally upwardly in the vertical direction.

8. The arrangement as recited claim 1, wherein the master cylinder is connected at a generally central area of the leaf spring and generally above the axle in a vertical direction.

9. The arrangement as recited in claim 1, wherein the master cylinder actuator is in hydraulic communication with the both the first and second slave cylinder actuators.

10. An agricultural implement, comprising:
    a wheeled chassis including at least one leaf spring in support of a frame and a tank on a transverse axle relative to a forward direction of travel; and
    an arrangement configured to reduce a movement of the tank from a generally level alignment relative to the axle, the arrangement comprising:
      a master cylinder actuator mounted between the frame and the leaf spring,
      a first slave cylinder actuator and a second slave cylinder actuator spaced apart and mounted between the tank and the and the frame, the first and second slave cylinders in fluid communication with the master cylinder,
wherein the master cylinder communicates a fluid signal representative of a movement of the leaf spring relative the frame, and wherein in response to the fluid signal, the arrangement reduces movement of the tank relative to the axle.

11. The agricultural implement as recited in claim 10, wherein the first slave cylinder is located forward of the axle and the second slave cylinder is located rearward of the axle relative to the forward direction of travel.

12. The agricultural implement as recited in claim 10, wherein the arrangement is a closed system such that the master cylinder, the first slave cylinder actuator, and the second slave cylinder actuator are only in fluid communication with one another.

13. The agricultural implement as recited in claim 10, wherein the master cylinder includes a lower end pivotally connected at the frame and an upper end that is connected at the leaf spring.

14. The agricultural implement as recited in claim 10, wherein each first and second slave cylinder actuator includes a lower end pivotally connected at the frame, and an upper end connected at the tank.

15. The agricultural implement as recited in claim 10, wherein the arrangement includes a left-hand sub-arrangement located on one side of a central longitudinal axis of the vehicle opposite a right-hand sub-arrangement, each left-hand and right-hand sub-arrangement includes the master cylinder in fluid communication with the first and second slave cylinders.

16. The agricultural implement as recited in claim 10, wherein a signal representative of a deflection of the leaf spring upwardly in a vertical direction relative to the frame causes the slave cylinders to extend generally upwardly in the vertical direction.

17. The agricultural implement as recited claim 10, wherein the leaf spring includes a first end connected at the frame forward of the axle and a second end connected at the frame rearward of the axle, and the axle is generally centrally located therebetween, and wherein the master cylinder is connected at the leaf spring and generally above the axle in a vertical direction.

18. The agricultural implement as recited in claim 10, wherein the master cylinder actuator is in hydraulic communication with the both the first and second slave cylinder actuators.

19. A method of reducing a movement of the tank from a generally level alignment relative an axle of a wheeled chassis, the method comprising the steps of:
   detecting a movement of a leaf spring relative to a frame of the wheeled chassis assembly via a master cylinder, the leaf spring in support of the frame and the tank on the axle;
   communicating a signal representative of the movement of the leaf spring relative to the frame from the master to a pair of slave cylinders mounted between the tank and the frame; and
   moving the pair of slave cylinder actuators in response to the signal so as to reduce movement of the tank relative to the axle.

20. The method as recited in claim 19, wherein the master cylinder actuator and the pair of slave cylinder actuators are only in fluid communication with one another.

* * * * *